Jan. 29, 1963            R. C. JUNG            3,075,366
REFRIGERATOR AIR FLOW ARRANGEMENT
Filed March 23, 1961            2 Sheets-Sheet 2
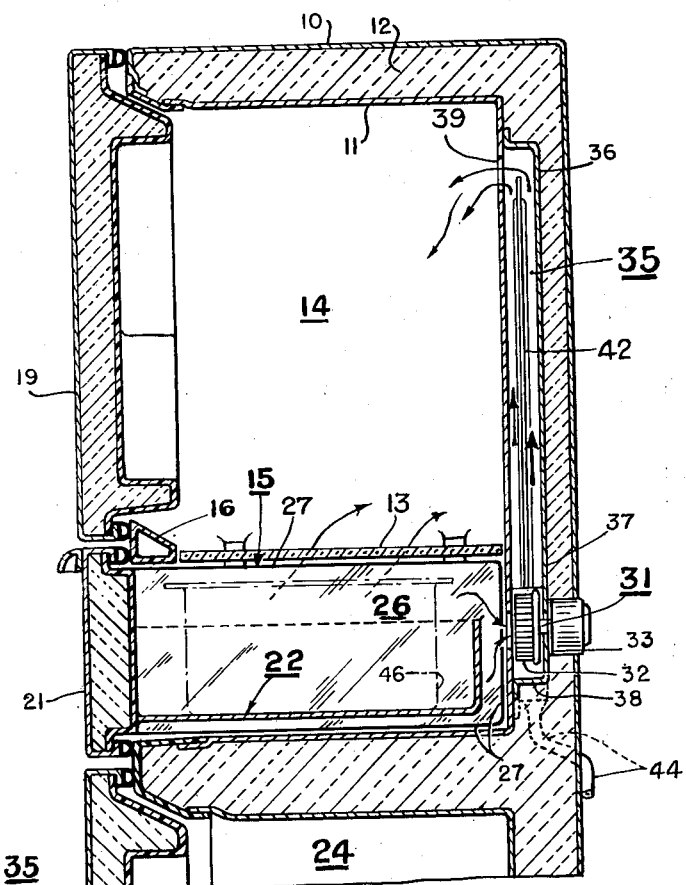
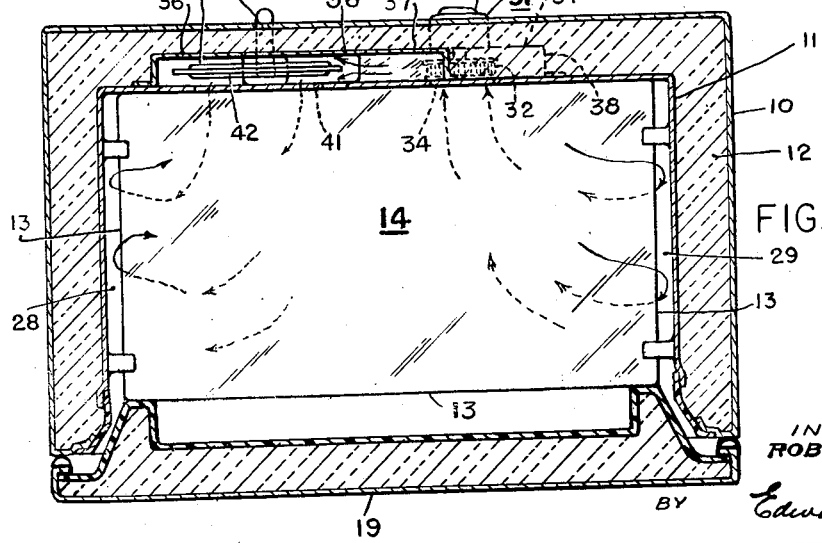
INVENTOR
ROBERT C. JUNG
BY Edward A. Sager
ATTORNEY

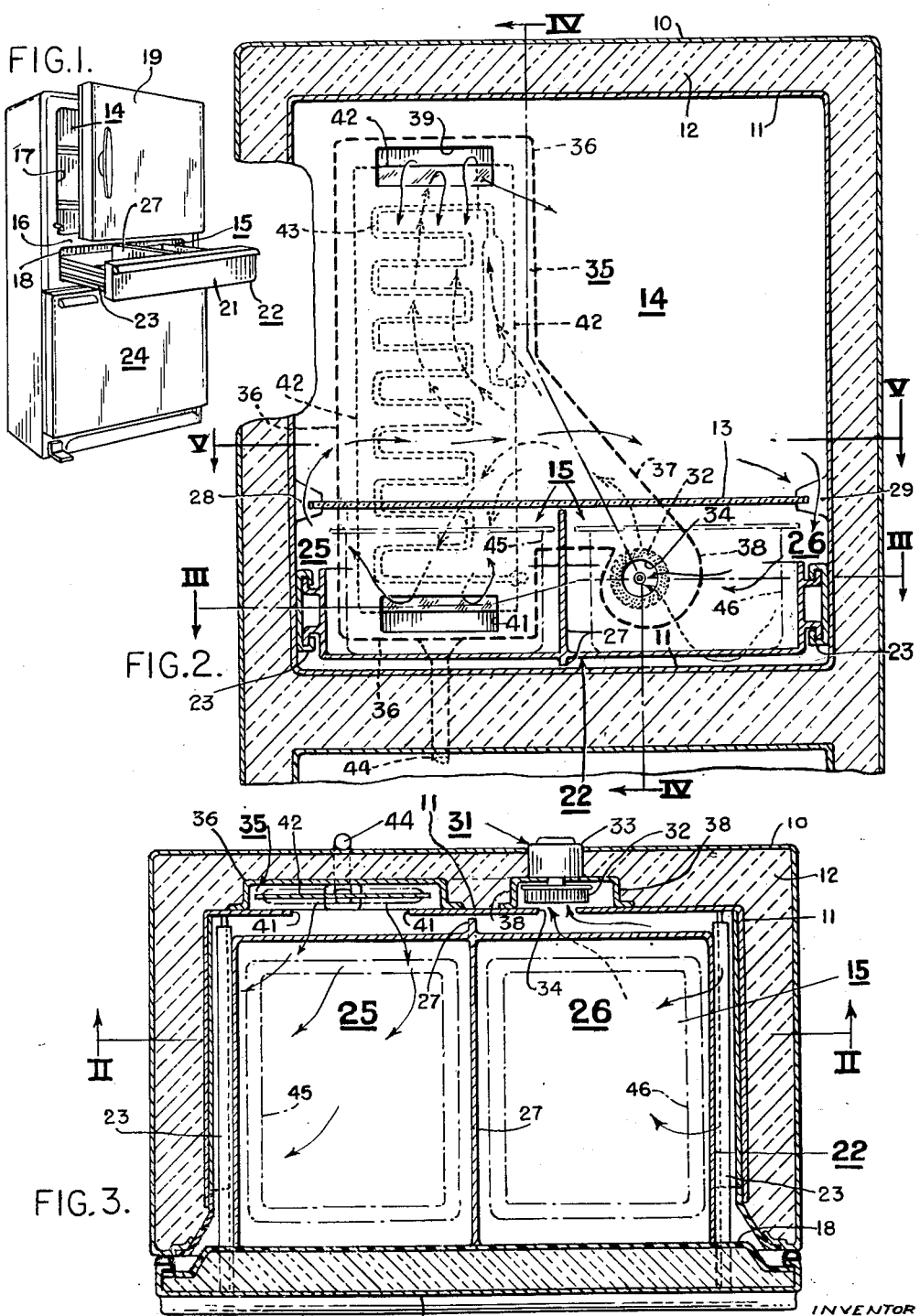

United States Patent Office 3,075,366
Patented Jan. 29, 1963

3,075,366
REFRIGERATOR AIR FLOW ARRANGEMENT
Robert C. Jung, Columbus, Ohio, assignor to Westinghouse Electric Corporation, East Pittsburgh, Pa., a corporation of Pennsylvania
Filed Mar. 23, 1961, Ser. No. 97,954
8 Claims. (Cl. 62—382)

This invention relates to a refrigerator having a plurality of zones cooled to different temperatures, and it has for an object to provide improved apparatus of this kind.

A further object of the invention is to provide improved means for simultaneously refrigerating various zones of a refrigerator at different temperatures. These zones are, for example, the general storage area, the meat storage chamber and the vegetable crisping chamber of a domestic refrigerator.

In practicing the invention, as applied to a domestic refrigerator, the chambers for the storage of meat at relatively low temperature and vegetables at a higher temperature are separated from the general storage compartment by suitable walls or baffles. There is provided, however, one passage for the flow of air from the meat storage chamber to the compartment, and a second passage for the flow of air from the general storage compartment to the vegetable storing chamber. A fan is employed for withdrawing air from the vegetable chamber and discharging the air through a duct to the upper region of the general storage compartment and to the meat storage chamber. A refrigerated member in the duct cools the air passing through the duct to a temperature suitable for maintaining the meat chamber at a temperature of the order of 30 degrees F., and the relatively large general storage compartment at approximately 38 degrees F.

The refrigerated air, after abstracting heat from the general storage compartment and the meat chamber, passes to the vegetable chamber at the temperature of the general storage compartment or slightly higher. Accordingly, the vegetables are refrigerated at a temperature optimum for their preservation without excessive dehydration. The warmed air then passes to the fan and duct for refrigeration.

Preferably, the meat chamber and the vegetable crisper chamber are disposed beneath the main storage compartment in side-by-side relation for convenience. The duct and cooling unit are arranged at one side of the compartment to the rear of the meat chamber and the fan is to the rear of the vegetable crisper chamber and discharges into an arm of the duct extending laterally therefrom. Accordingly, the fan is remote from and to one side of the cooling unit so that water, dripping from the unit during defrosting, is precluded from reaching the fan. This arrangement also facilitates the draining of defrost water from the bottom of the duct. Furthermore, by locating the fan inlet as set forth, air is withdrawn from the lowest region of the main storage compartment so that stratification and temperature differential of the air in the main compartment are minimized.

The foregoing and other objects are effected by the invention as will be apparent from the following description taken in connection with the accompanying drawings, forming a part of this application, in which:

FIG. 1 is a perspective view of a domestic refrigerator constructed and arranged in accordance with the invention;

FIG. 2 is a vertical sectional view taken through the refrigerator of FIG. 1 and along the line II—II of FIG. 3;

FIG. 3 is a horizontal sectional view taken along the line III—III of FIG. 2;

FIG. 4 is a vertical sectional view, taken along line IV—IV of FIG. 2; and

FIG. 5 is a horizontal sectional view, taken along line V—V of FIG. 2.

While this invention is applicable to various types of refrigerators, it is particularly applicable to domestic machines and will be described in connection therewith. Domestic refrigerators are usually provided with a relatively large compartment for the general storage of food and a pair of smaller chambers for respectively storing meat and vegetables. The general storage compartment is usually maintained at a temperature of approximately 38 degrees F. and the meat storage chamber at a temperature slightly above the freezing temperature of meat or of the order of 30 degrees F. The vegetable chamber may be maintained at a higher temperature approximating the 38 degree temperature of the general storage area, or slightly higher. The meat is contained in a covered pan and may be preserved fresh and unfrozen for at least several days at the 30 degree temperature. Vegetables stored in a covered pan at a temperature of the order of 38 to 40 degrees F. are preserved crisp and without objectionable dehydration.

Referring now to the drawings illustrating a domestic refrigerator of the type set forth above, a cabinet structure is employed having an outer shell 10, an inner liner 11 nested therein, and a body of heat insulation 12 between the liner and shell. The space within the liner 11 is divided by a horizontal partition 13 into an upper, relatively large, main food storage compartment 14 and a lower, more shallow, compartment 15. As shown in FIG. 1, the cabinet includes a mullion 16 at the open front side thereof that separates a relatively large access opening 17 for the main food storage compartment 14 and a smaller opening 18 for the lower compartment 15. The access opening 17 is closed by a suitable hinged door 19, and an insulated front panel 21 of a drawer, designated generally by the numeral 22, closes the opening 18 in the closed position of the drawer 22. The drawer 22 is slidably mounted on tracks 23 suitably supported in the compartment 15. The lower portion 24 of the cabinet shown may constitute a frozen food section but, since it forms no part of the present invention, it will not be further descibed.

In accordance with this invention, the compartment 15 is divided into a low temperature, meat storage chamber 25 and a higher temperature, vegetable storage chamber 26 by a vertical baffle 27 carried by and movable with the drawer 22. The baffle 27, as best shown in FIG. 2, has its upper, marginal edge contiguous to the partition 13 and the mullion 16 and its lower, marginal edge adjacent to the bottom of the liner 11. The baffle 27 extends from the inner side of the front panel 21 of the drawer 22 to adjacent the rear of the liner 11 in the closed position of the drawer 22, as shown in the drawings. Accordingly, the low and higher temperature chambers 25 and 26 are substantially isolated to preclude passage of air therebetween in the closed position of the drawer 22. As best shown in FIG. 2, air passages 28 and 29 associated with the partition 13 are provided. The former provides for flow of air from the low temperature chamber 25 to the main compartment 14 and the latter provides for passage of air from the compartment 14 to the higher temperature chamber 26; further reference to which is made hereinafter. Preferably, the air passages 28 and 29 are formed by spacing the latteral margins of the partition 13 from the sides of the liner 11, as shown in the drawings.

Refrigerated air is circulated through the main compartment 14 and chambers 25 and 26 by a blower 31, the revolving vanes 32 of which are driven by a motor 33 suitably carried by the rear of the cabinet. The blower 31 is located to the rear of chamber 26 and air enters the blower vanes 32 through an opening 34 in the rear wall of liner 11 below the partition 13. Air discharged by the blower 31 passes to a duct structure 35 carried by the rear of the liner 11 and which includes a vertically extending main body portion 36 and a laterally and downwardly extending arm 37. The latter communicates with the main body 36 of the duct 35 intermediate its upper and lower ends, and the bottom of the arm 37 forms a housing 38 for the blower vanes 32. The main body 36 of the duct has air discharge ports 39 and 41 communicating, respectively, with an upper region of the main food storage compartment 14 and the low temperature chamber 25.

Cooling of the air translated by the blower 31 is effected by a refrigerated plate 42 disposed within the body portion 36 of the duct 35, which plate 42 has a serpentine passage 43 for the passage of refrigerant. It will be noted that the air delivered by the blower enters the body portion 36 of the duct and passes upwardly and downwardly over the refrigerated plate 42 before being discharged. As the plate 42 is confined to the main vertical portion 36 of the duct, defrost water gravitating from the plate 42 will collect in the bottom of the duct portion 36 and may be drained away by a conduit 44. Since the blower 31 is laterally displaced from the refrigerated plate 42, no defrost water is deposited on or around the blower 31 to interfere with its operation.

The cold air issuing from port 39 passes through the compartment 14 abstracting heat from food stored therein and thence through passage 29 and chamber 26 to the blower 31 for recirculation. Cold air issuing from port 41 abstracts heat from the chamber 25 and then enters compartment 14 through passage 28. This air mixes with the air discharged through port 39 and assists in cooling the compartment 14 as the mixture moves to the passage 28. It will be understood that the meat products stored in chamber 25 are confined in a conventional covered pan, shown in dot and dash lines at 45, and also that the vegetables stored in the chamber 26 are contained in a similar pan shown at 46. Accordingly, the products stored in these pans 45 and 46 are not subjected directly to the body of air moving through chambers 25 and 26, whereby dehydration of the products is prevented or substantially reduced, all of which is well understood.

The means for circulating refrigerant through the passage 43 of plate 42, per se, forms no part of this invention and has not been shown for the sake of clearness and brevity. However, refrigerators of the type disclosed usually employ refrigerating systems of the well-known compressor-condenser-evaporator type wherein the cold plate 43 functions as a refrigerant evaporator. Circulation of refrigerant through plate 43 may be controlled in accordance with the temperature thereof and, in the present embodiment, the plate is preferably operated between temperatures of the order of $-10$ degrees F. and 36 degrees F. Accordingly, defrosting of the plate 43 is carried out with each cycle of operation. And the 38 degree F. mean temperature in the compartment is maintained by cycling the blower 31 responsive to the temperature of the air in the compartment, as is well known.

The relative amounts of cold air delivered to the low temperature chamber 25 and compartment 14 are predetermined and fixed in order to properly divide the refrigerating effect therebetween. In this connection, it will be observed that some refrigeration of the low temperature chamber 25 continues during inactive periods of the blower 31 because of natural convection currents induced by the cold plate 43. This natural current of cold air passes outwardly from duct portion 36 through port 41 and, after abstracting heat from the chamber 25, moves upwardly through passage 28 and compartment 14 and enters the duct through port 39. The cooling effect of these natural air currents is employed for assisting in the maintenance of the temperature difference between the chamber 25 and compartment 14.

While the invention is shown applied to a drawer type refrigerator, it will be understood that it may be applied equally well to more conventional type cabinets wherein a single door is used to give access to the main compartment and both auxiliary chambers. However, it does have an advantage when applied to the disclosed embodiment, since the drawer structure blocks the access opening 18 in a great measure when the drawer is retracted and, therefore, there is only a relatively small amount of air leakage to the ambient atmosphere through the opening 18. In single door cabinets, it will be found advantageous to stop the blower during door openings by a conventional door switch, but this is not necessary during drawer openings with the drawer type, because the drawer substantially closes off the opening 18. It will be noted that, in the open position of the drawer 22, the port 41 and air discharge opening 34 are in direct communication, with the result that only a small amount of refrigerated air will mix with room air when the drawer is open and the blower 31 is operating.

From the foregoing description, it will be apparent that improved and simplified means have been provided for maintaining various temperatures in different zones of a refrigerator cabinet. The circulating means for the refrigerated air is so arranged that proper temperatures are maintained in the various zones by forced and natural convection air currents. Furthermore, the arrangement is such that defrost water is not only precluded from collecting adjacent the blower structure but is readily drained from the housing of the refrigerated plate. It will also be noted that, since air is withdrawn from a lowermost region of the large main compartment, stratification with air temperature differential therein is minimized.

While the invention has been shown in but one form, it will be obvious to those skilled in the art that it is not so limited, but is susceptible of various changes and modifications without departing from the spirit thereof.

What is claimed is:

1. In a refrigerator, the combination of an insulated cabinet structure enclosing a primary food storage compartment and a pair of auxiliary chambers disposed side by side and adjacent one side of the primary compartment, one of said chambers being adapted for the storage of food at relatively low temperature and the other chamber being adapted for the storage of food at a higher temperature, said cabinet structure having a first air passage for the flow of air from said one chamber to the primary compartment and a second air passage for the flow of air from the primary compartment to said other chamber, air translating means for withdrawing air from said other chamber, a duct receiving the air from the air translating means and having first and second ports for respectively discharging air to the primary compartment and said one chamber, and means arranged in said duct for refrigerating the air translated therethrough.

2. In a refrigerator, the combination of a cabinet having an insulated space formed therein, a baffle structure dividing the space to provide a relatively large food storage compartment and a pair of relatively small chambers at one side of said compartment, said baffle structure providing one passage for the flow of air from one of the chambers to said compartment and a second passage for delivering air from the compartment to the other of said chambers, a blower for withdrawing air from said other chamber, a duct receiving air from the blower and having first and second air discharge ports for, respectively, delivering air to the compartment and said one chamber, and means refrigerating the air translated by the blower through said duct.

3. In a refrigerator, the combination of a cabinet having an insulated space formed therein, a T-shape baffle structure disposed in a lower region of said space and forming a relatively large food compartment in the upper portion of the space and a pair of relatively small food storage chambers below said compartment, said baffle structure having one passage for flow of air from one of said chambers to the compartment and a second passage for flow of air from the compartment to the other of said chambers, a fan having its inlet connected to said other chamber, a duct arranged for receiving air from the fan and having first and second air discharge ports for respectively delivering air to the compartment and said one chamber, and means for refrigerating the air translated through the duct, the construction and arrangement being such that the temperature of the food in said one chamber is maintained at a relatively low value by the refrigerated air delivered thereto directly by the duct and the temperature of the food in said second chamber is maintained at a higher value by air after its abstraction of heat from the compartment and said one chamber.

4. In a refrigerator having heat insulating walls forming a space therewithin, a horizontal baffle arranged in a lower region of the space and providing a relatively large open front upper compartment for the storage of food and a relatively shallow compartment in the lower portion of the space, a door closing the upper compartment, a drawer structure closing the lower compartment and disposed beneath said baffle, said drawer structure including a vertical baffle dividing said lower compartment into a low temperature cooling chamber and a higher temperature cooling chamber, means slidably supporting the drawer structure for movement out of the lower compartment, first and second containers for food disposed, respectively, in the low and higher temperature chambers and carried by the drawer structure on opposite sides of the vertical baffle, means providing first and second passages for air between said upper compartment and the respective low and higher temperature chambers, a blower having an air inlet communicating with said higher temperature chamber, a duct receiving air from the blower and having a pair of air discharge ports, one of said ports delivering air to the upper compartment and the second port being disposed to deliver air to the low temperature chamber, and means disposed in the duct for refrigerating air passing therethrough to said ports.

5. In a refrigerator, the combination of a cabinet enclosing a heat insulated space, a baffle structure disposed in the space and dividing the latter into a main relatively large food storage compartment and relatively small, low and higher temperature chambers beneath said compartment in side-by-side relationship, said baffle structure providing one air passage for flow of air from the low temperature chamber to the compartment and a second air passage for flow of air from the compartment to said higher temperature chamber, a duct having vertically spaced air discharge openings communicating, respectively, with an upper portion of the main compartment and with said low temperature chamber, a refrigerating element in said duct, a blower having an inlet for withdrawing air from the higher temperature chamber and means conveying air from the blower to an intermediate region of the duct for passage upwardly and downwardly over the refrigerating element.

6. In a refrigerator, the combination of a cabinet enclosing a heat insulated space, a baffle structure disposed in the space and dividing the latter into a main relatively large food storage compartment and relatively small, low and higher temperature chambers beneath said compartment in side-by-side relationship, said baffle structure providing one air passage for the flow of air from the low temperature chamber to the compartment and a second air passage for flow of air from the compartment to said higher temperature chamber, a duct having vertically spaced air discharge openings communicating, respectively, with an upper portion of the main compartment and with said low temperature chamber, a refrigerating element in said duct, a blower laterally spaced from the refrigerating element and having an inlet disposed for withdrawing air from the higher temperature chamber, means conveying air from the blower to an intermediate region of the duct for passage upwardly and downwardly over the refrigerating element and means for draining condensate from a lower portion of the duct.

7. In a refrigerator, the combination of a cabinet structure enclosing a main food storage compartment and a low temperature food storage chamber adjacent one side of said compartment, means providing for flow of air from the chamber to the main compartment, a vertical duct having upper and lower air discharge ports communicating with said main compartment and said chamber respectively, a blower for withdrawing air from a lower region of said main compartment, means delivering air discharged by the blower to an intermediate portion of the duct for passage upwardly and downwardly to the upper and lower air discharge ports thereof, a refrigerated element disposed in said duct for cooling air translated therethrough and a conduit for removing defrost water draining from said element from a lowermost region of the duct.

8. In a refrigerator, the combination of a cabinet structure enclosing a main food storage compartment and a low temperature food storage chamber adjacent one side of said compartment, means providing for flow of air from the chamber to the main compartment, a vertical duct having upper and lower air discharge ports communicating with said main compartment and said chamber respectively, said duct having an air inlet branch extending laterally from a mid portion thereof, a refrigerated element within the duct and extending from adjacent one of the air discharge ports to adjacent the other port, means for translating air from a lower region of the main compartment to said air inlet branch of the duct for passage upwardly and downwardly over the refrigerated element, and a conduit for removing water from the region of the duct below said refrigerated element.

References Cited in the file of this patent
UNITED STATES PATENTS

| 2,826,046 | Tobiasz | Mar. 11, 1958 |
| 2,907,180 | Mann | Oct. 6, 1959 |